United States Patent
Li

(10) Patent No.: US 12,432,718 B2
(45) Date of Patent: Sep. 30, 2025

(54) METHOD FOR ALLOCATING TIME DOMAIN RESOURCES, DATA TRANSMISSION METHOD, BASE STATION, AND TERMINAL

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 476 days.

(21) Appl. No.: 17/417,065

(22) PCT Filed: Dec. 26, 2018

(86) PCT No.: PCT/CN2018/124004
§ 371 (c)(1),
(2) Date: Jun. 21, 2021

(87) PCT Pub. No.: WO2020/132971
PCT Pub. Date: Jul. 2, 2020

(65) Prior Publication Data
US 2022/0053528 A1      Feb. 17, 2022

(51) Int. Cl.
H04W 72/1268 (2023.01)
H04W 72/0446 (2023.01)
H04W 72/23 (2023.01)

(52) U.S. Cl.
CPC ... *H04W 72/1268* (2013.01); *H04W 72/0446* (2013.01); *H04W 72/23* (2023.01)

(58) Field of Classification Search
CPC ............. H04L 5/0044; H04L 5/0078; H04W 72/0446; H04W 72/1268; H04W 72/23; H04W 72/231; H04W 72/232
See application file for complete search history.

(56) References Cited

U.S. PATENT DOCUMENTS

| | | | |
|---|---|---|---|
| 7,146,172 B2 | 12/2006 | Li et al. | |
| 2017/0332395 A1 | 11/2017 | Yin et al. | |
| 2018/0124611 A1* | 5/2018 | Moon | H04W 72/0453 |
| 2018/0324768 A1 | 11/2018 | Shaheen et al. | |
| 2019/0082431 A1* | 3/2019 | Yi | H04W 72/0446 |
| 2021/0058954 A1* | 2/2021 | Li | H04W 72/1273 |
| 2021/0298045 A1* | 9/2021 | Kim | H04W 72/0453 |

(Continued)

FOREIGN PATENT DOCUMENTS

| | | |
|---|---|---|
| CN | 108076525 A | 5/2018 |
| CN | 108282879 A | 7/2018 |

(Continued)

OTHER PUBLICATIONS

European Patent Application No. 18944206.4, Search and Opinion dated Jun. 22, 2022; 27 pages.

(Continued)

*Primary Examiner* — Pao Sinkantarakorn
(74) *Attorney, Agent, or Firm* — Cozen O'Connor

(57) ABSTRACT

A base station transmits downlink control information, DCI, signaling. The DCI signaling indicates a time domain resource to be used to perform physical uplink shared channel, PUSCH, by a terminal. The time domain resource includes at least one slot, at least one mini-slot, or both the at least one slot and at least one mini-slot.

17 Claims, 4 Drawing Sheets

(56) References Cited

U.S. PATENT DOCUMENTS

2021/0314983 A1* 10/2021 Karaki .................. H04L 5/0044
2021/0320753 A1* 10/2021 Shimezawa ........... H04L 1/1816
2021/0345124 A1* 11/2021 Myung ................. H04W 16/14

FOREIGN PATENT DOCUMENTS

WO     WO 2018143316 A1     8/2018
WO     WO 2018204344 A1     11/2018

OTHER PUBLICATIONS

Vivo "DCI contents and design" 3GPP TSG RAN WG1 NR Meeting 91; R1-1719783; Nov. 2017; 6 pages.
Japanese Patent Application No. 2021-531782, Office Action dated Jun. 17, 2022; 4 pages.
Japanese Patent Application No. 2021-531782, English translation of Office Action dated Jun. 17, 2022; 5 pages.
Lenovo et al. "Frame structure for NR-U" 3GPP TSG RAN WG1 Meeting #95; R1-1812779; Nov. 2018; 5 pages.
Qualcomm Incorporated "On performance requirements for Rel-14 eLAA" 3GPP TSG RAN WG4 #81; R4-1609708; Nov. 2016; 4 pages.
Samsung "PUSCH Scheduling for LAA" 3GPP TSG RAN WG1 #85; R1-164741; May 2016; 3 pages.
Korean Patent Application No. 10-2021-7021735, Office Action dated May 9, 2023, 6 pages.
Korean Patent Application No. 10-2021-7021735, English translation of Office Action dated May 9, 2023, 6 pages.
Singapore Patent Application No. 11202106885Q, Office Action dated Mar. 29, 2023, 12 pages.
Lenovo et al. "UL signals and channels for NR-U operation", 3GPP TSG RAN WG1 Meeting #95, R1-1812780, Nov. 2018, 5 pages.
PCT/CN2018/124004 English translation fo the International Search Report dated Sep. 22, 2019, 2 pages.
AT&T: "On DCI Contents and Formats", 3GPP Draft; R1-1719643, Dec. 1, 2017 (Dec. 1, 2017), Reno, USA, pp. 1-9.
LG Electronics: "Discussion on Resource Allocation and TBS Determination", 3GPP Draft; R1-1719929, Dec. 1, 2017 (Dec. 1, 2017), Reno, USA, pp. 1-16.
Indian Patent Application No. 202147030955, Office Action dated Mar. 7, 2022, 7 pages.
Japanese Patent Application No. 2023-075191 Office Action dated Nov. 15, 2024 with English translation, 8 pages.
Samsung, "DL/UL Resource Allocation", 3GPP TSG RAN WG1 Meeting 91, R1-1720339, Nov. 2017, 10 pages.
Samsung, "DL/UL Resource Allocation", 3GPP TSG RAN WG1 Meeting 90bis, R1-1717662, Oct. 2017, 12 pages.
LG Electronics, "Discussion on resource allocation and TBS determination", 3GPP TSG RAN WG1 Meeting 90bis, R1-1717965, Oct. 2017, 19 pages.
ETRI, "Indication of starting symbol for multi-subframe scheduling", 3GPP TSH RAN WG1 Meeting #86, R1-167734, Aug. 2016, 4 pages.
OPPO, "Resource allocation for PDSCH/PUSCH", 3GPP TSG RAN WG1 Meeting 90bis, R1-1718048, Oct. 2017, 14 pages.

* cited by examiner

METHOD FOR ALLOCATING TIME DOMAIN RESOURCES, DATA TRANSMISSION METHOD, BASE STATION, AND TERMINAL

CROSS-REFERENCE TO RELATED APPLICATION(S)

The present application is a 371 application of International Patent Application No. PCT/CN2018/124004, filed on Dec. 26, 2018, the disclosure of which is incorporated herein by reference in its entirety.

TECHNICAL FIELD

The disclosure relates to a field of communication technology, and more particularly, to a method for allocating time domain resources, a method for transmitting data, a base station, and a terminal.

BACKGROUND 5G (5th-Generation, fifth generation of mobile communication technology) NR (New Radio) is an important application scenario in 5G field, which can use an unlicensed spectrum to transmit data. The unlicensed spectrum refers to a spectrum that can be used for free without spectrum licenses. For example, commonly used Wi-Fi uses unlicensed spectrums. Since the unlicensed spectrums are not managed by network deployment of operators, a base station needs to allocate time domain resources to a terminal, for avoiding interference from neighboring base stations. Based on the allocated time domain resource, the terminal adopts LBT (Listen Before Talk) mechanism to monitor PUSCH (Physical Uplink Shared Channel). If it is monitored by the terminal that the PUSCH is idle in a time domain resource, PUSCH transmission is performed on the time domain resource.

LAA (Licensed-Assisted Access) defines the time domain resource where the length of a subframe is 1 ms (milliseconds), each subframe includes two slots, and each slot includes 7 symbols. Based on the above definition, multiple subframes can be scheduled with an uplink scheduling mode of the LAA, the PUSCH transmission can be performed by a UE in each scheduled subframe, and independent configuration of RV (Redundancy Version) of data transmitted in each subframe can be achieved.

SUMMARY

It is provided here a method for allocating time domain resources. In one embodiment, the method is applied to a base station, and the method includes:
transmitting downlink control information, DCI, signaling by the base station, the DCI signaling being configured to indicate a time domain resource used by a terminal to perform physical uplink shared channel, PUSCH, transmission, the time domain resource including at least one slot and/or at least one mini-slot.

It is also provided here a method for transmitting data. In one embodiment, the method is applied to a terminal and includes:
receiving, by the terminal, downlink control information, DCI, signaling transmitted by a base station, the DCI signaling being configured to indicate a time domain resource used by the terminal to perform physical uplink shared channel, PUSCH, transmission, the time domain resource including at least one slot and/or at least one mini-slot; and
performing the PUSCH transmission by the terminal based on the DCI signaling.

It is also provided here a terminal for transmitting data. In one embodiment, the terminal includes:
a processor, and
a memory storing instructions executable by the processor;
in which the processor is configured to:
receive, by the terminal, downlink control information, DCI, signaling transmitted by a base station, the DCI signaling being configured to indicate a time domain resource used by the terminal to perform physical uplink shared channel, PUSCH, transmission, the time domain resource including at least one slot and/or at least one mini-slot; and
perform the PUSCH transmission by the terminal based on the DCI signaling.

It is to be understood that the above general description and the following detailed description are only exemplary and explanatory and do not limit the disclosure.

BRIEF DESCRIPTION OF THE DRAWINGS

The drawings herein are incorporated into the specification and constitute a part of the specification, show embodiments in accordance with the disclosure and are used to explain the principle of the disclosure together with the specification.

DETAILED DESCRIPTION

Figure 1:
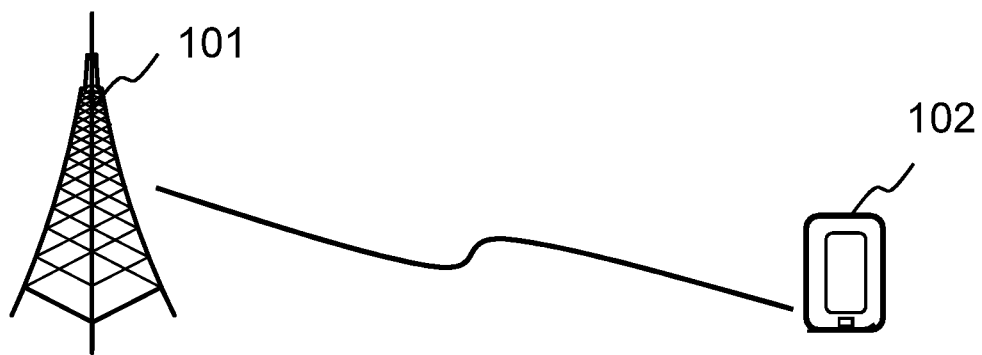
FIG. 1 is an architecture diagram of a communication system according to some embodiments.

Embodiments will be described in detail here, and examples thereof are shown in the accompanying drawings. When the following description refers to the drawings, unless otherwise indicated, the same numbers in different drawings indicate the same or similar elements. The implementation manners described in the following embodiments do not represent all implementation manners consistent with the disclosure. Rather, they are merely examples of devices and methods consistent with some aspects of the disclosure as detailed in the appended claims.

At present, multiple concepts, such as subcarrier spacing and mini-slot, are proposed in NR, and the slot and its length are redefined. However, for NR-based access to unlicensed spectrum (or NR-unlicensed (NR-U) spectrum access), how to allocate time domain resources based on slots and mini-slots in NR is a problem to be solved. Therefore, how to allocate time domain resources in the NR-U scenario is a concerned issue for those skilled in the art.

The disclosure provides a method for allocating time domain resources, a method for transmitting data, a base station, and a terminal to overcome the above problems.

The method for allocating time domain resources is applied to a base state and includes: transmitting downlink control information, DCI, signaling by the base station, the DCI signaling being configured to indicate a time domain resource used by a terminal to perform physical uplink shared channel, PUSCH, transmission, the time domain resource including at least one slot and/or at least one mini-slot.

In some examples, the DCI signaling is further configured to indicate a starting symbol and/or an ending symbol of the time domain resource. The starting symbol is configured to indicate a starting symbol of the PUSCH transmission performed by the terminal, and the ending symbol is configured to indicate an ending symbol of the PUSCH transmission performed by the terminal.

In some examples, the time domain resource is at least one slot, and a scheduling mode of the time domain resource is scheduling based on each slot.

In some examples, the starting symbol of the time domain resource is set for a first one or each one of the at least one slot; and/or the ending symbol of the time domain resource is set for a last one or each one of the at least one slot.

In some examples, the DCI signaling is further configured to indicate N redundancy versions, RVs, and the terminal uses a respective RV to perform the PUSCH transmission in each slot of the time domain resource, where N is the number of the slots in the time domain resource indicated by the DCI signaling.

In some examples, the time domain resource is at least one mini-slot, and a scheduling mode of the time domain resource is scheduling based on each mini-slot; or the starting symbol of the time domain resource is set for a first mini-slot or each mini-slot, and the DCI signaling is further configured to indicate the number of symbols included in each mini-slot.

In some examples, the starting symbol of the time domain resource is set for each mini-slot, and an adjacent symbol before the starting symbol of an $S^{th}$ mini-slot is the ending symbol of a $(S-1)^{th}$ mini-slot.

In some examples, the DCI signaling is further configured to indicate M redundancy versions, RVs, and the terminal uses a respective RV to perform the PUSCH transmission in each mini-slot of the time domain resource, where, M is the number of the mini-slots in the time domain resource indicated by the DCI signaling.

In some examples, the time domain resource is at least one slot and at least one mini-slot, and a scheduling mode of the time domain resource includes scheduling based on each slot for the at least one slot and scheduling based on at least one mini-slot for the at least one mini-slot.

In some examples, the starting symbol of the time domain resource is set for each one or a first one of the at least one slot, and/or for a first one or each one of the least one mini-slot; and/or the ending symbol of the time domain resource is set for each one or a last one of the at least one slot, and/or for each one of the at least one mini-slot.

In some examples, the DCI signaling is further configured to indicate K redundancy versions, RVs, and the terminal uses a respective RV to perform the PUSCH transmission in each slot and each mini-slot of the time domain resource, where, K is the number of the slots and the mini-slots in the time domain resource indicated by the DCI signaling.

In some examples, a position near the starting symbol of PUSCH transmission in each slot or mini-slot is a PUSCH transmission starting position.

In some examples, the position near the starting symbol of PUSCH transmission in each slot or mini-slot being the PUSCH transmission starting position includes: the starting symbol of the PUSCH transmission in each slot or mini-slot being the PUSCH transmission starting position; or a position away from and after the starting symbol of PUSCH transmission by a preset duration in each slot or mini-slot being the PUSCH transmission starting position; or a position away from and after the starting symbol of the PUSCH transmission by a preset duration plus a timing advance (TA) in each slot or mini-slot being the PUSCH transmission starting position; or a starting position of an adjacent symbol after the starting symbol of PUSCH transmission in each slot or mini-slot being the PUSCH transmission starting position.

In some examples, the method further includes transmitting control signaling by the base station; the control signaling being configured to indicate a stopping position of listen before talk, LBT, monitoring performed by the terminal, and the control signaling comprising one or a combination of radio resource control, RRC, signaling, media access control, MAC, signaling, and the DCI signaling.

In some examples, each slot includes 14 symbols, and the starting symbol is any one of the 14 symbols.

In some examples, in a case where a scheduling mode of the time domain resource is scheduling based on each slot, each slot has at least one starting symbol.

The method for transmitting data is applied to a terminal and includes: receiving, by the terminal, downlink control information, DCI, signaling transmitted by a base station, the DCI signaling being configured to indicate a time domain resource used by the terminal to perform physical uplink shared channel, PUSCH, transmission, the time domain resource including at least one slot and/or at least one mini-slot; and performing the PUSCH transmission by the terminal based on the DCI signaling.

In some examples, the DCI signaling is further configured to indicate a starting symbol and/or an ending symbol of the time domain resource; and performing the PUSCH transmission by the terminal based on the DCI signaling includes: determining a starting symbol of the PUSCH transmission based on the starting symbol and/or determining an ending symbol of the PUSCH transmission based on the ending symbol by the terminal.

In some examples, the time domain resource is at least one slot, and a scheduling mode of the time domain resource is scheduling based on each slot.

In some examples, the starting symbol of the time domain resource is set for a first one or each one of the at least one slot; and/or the ending symbol of the time domain resource is set for a last one or each one of the at least one slot.

In some examples, the DCI signaling is further configured to indicate N redundancy versions, RVs, and performing the PUSCH transmission by the terminal based on the DCI signaling includes: the terminal using a respective RV to perform the PUSCH transmission in each slot of the time domain resource, where N is the number of the slots in the time domain resource indicated by the DCI signaling.

In some examples, the time domain resource is at least one mini-slot, and a scheduling mode of the time domain resource is scheduling based on each mini-slot.

In some examples, the starting symbol of the time domain resource is set for a first mini-slot or each mini-slot, and the DCI signaling is further configured to indicate the number of symbols included in each mini-slot; or the starting symbol of the time domain resource is set for each mini-slot, and an adjacent symbol before the starting symbol of an $S^{th}$ mini-slot is the ending symbol of a $(S-1)^{th}$ mini-slot.

In some examples, the DCI signaling is further configured to indicate M redundancy versions, RVs, and performing the PUSCH transmission by the terminal based on the DCI signaling includes: the terminal using a respective RV to perform the PUSCH transmission in each mini-slot of the time domain resource, where, M is the number of the mini-slots in the time domain resource indicated by the DCI signaling.

In some examples, the time domain resource is at least one slot and at least one mini-slot, and a scheduling mode of the time domain resource includes scheduling based on each slot for the at least one slot and scheduling based on at least one mini-slot for the at least one mini-slot; and/or the starting symbol of the time domain resource is set for each one or a first one of the at least one slot, and/or for a first one or each one of the least one mini-slot.

In some examples, the ending symbol of the time domain resource is set for each one or a last one of the at least one slot, and/or for each one of the at least one mini-slot.

In some examples, the DCI signaling is further configured to indicate K redundancy versions, RVs, and performing the PUSCH transmission by the terminal based on the DCI signaling includes: the terminal using a respective RV to perform the PUSCH transmission in each slot and each mini-slot of the time domain resource, where, K is the number of the slots and the mini-slots in the time domain resource indicated by the DCI signaling.

In some examples, a position near the starting symbol of PUSCH transmission in each slot or mini-slot is a PUSCH transmission starting position.

In some examples, performing the PUSCH transmission by the terminal based on the DCI signaling includes: performing, by the terminal, the PUSCH transmission by taking the starting symbol of the PUSCH transmission in each slot or mini-slot as the PUSCH transmission starting position; or performing, by the terminal, the PUSCH transmission by taking a position away from and after the starting symbol of the PUSCH transmission by a preset duration in each slot or mini-slot as the PUSCH transmission starting position; or performing, by the terminal, the PUSCH transmission by taking a position away from and after the starting symbol of the PUSCH transmission by a preset duration plus a timing advance, TA, in each slot or mini-slot as the PUSCH transmission starting position; or performing, by the terminal, the PUSCH transmission by taking a starting position of an adjacent symbol after the starting symbol of the PUSCH transmission as the PUSCH transmission starting position.

In some examples, the method further includes: receiving, by the terminal, control signaling transmitted by the base station, the control signaling being configured to indicate a stopping position of listen before talk, LBT, monitoring performed by the terminal, the control signaling comprising one or a combination of radio resource control, RRC, signaling, media access control, MAC, signaling, and the DCI signaling; or obtaining a stopping position of listen before talk, LBT, monitoring from a chip.

In some examples, each slot includes 14 symbols, and the starting symbol is any one of the 14 symbols.

The base station is configured to execute the above-mentioned method for allocating time domain resources.

The terminal is configured to execute the above-mentioned method for transmitting data.

With the disclosure, the base station transmits the DCI signaling and indicates the time domain resource used by the terminal to perform the PUSCH transmission in the DCI signaling. A method for allocating time domain resources in a NU-R scenario is provided, the success rate of uplink transmission and spectrum efficiency are improved.

In detail, the method for allocating time domain resources, the method for transmitting data, the base station, and the terminal will be described below.

FIG. 1 illustrates an architecture diagram of a communication system according to embodiments of the disclosure. As illustrated in FIG. 1, the communication system includes a base station 101 and a terminal 102.

The base station 101 is configured to provide various communication services to the terminal 101 and control the terminal 101 to perform corresponding operations.

The terminal 102 may be a smart phone, a PDA (personal digital assistant), such as palmtop computer, or the like. The terminal 102 is configured to obtain various communication services from the base station 101 and perform corresponding operations based on control instructions from the base station.

Figure 2:
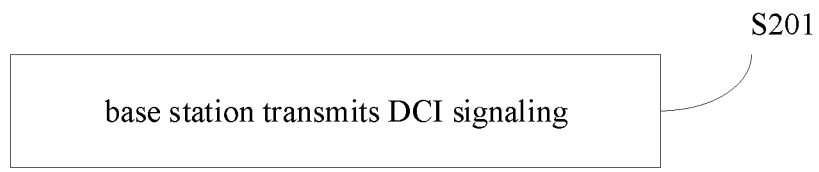
FIG. 2 is a flowchart illustrating a method for allocating time domain resources according to some embodiments.

FIG. 2 is a flowchart illustrating a method for allocating time domain resources according to some embodiments. As illustrated in FIG. 2, the method for allocating time domain resources is applied to a base station and includes the following.

In block S201, the base station transmits DCI (downlink control information) signaling.

The DCI signaling is configured to indicate a time domain resource used by the terminal for PUSCH (physical uplink shared channel) transmission. The time domain resource includes at least one slot and/or at least one mini-slot. That is, the time domain resource may include at least one slot, at least one mini-slot, or both the at least one slot and the at least one mini-slot.

With the method according to embodiments of the disclosure, the base station sends the DCI signaling and designates the time domain resource on which the PUSCH transmission is performed by the terminal. By providing a method for allocating time domain resources in a NR-U scenario, a success rate of uplink transmission and spectrum efficiency are improved.

In another possible implementation, the DCI signaling is further configured to indicate a starting symbol and/or an ending symbol of the time domain resource.

The starting symbol is configured to indicate a starting symbol of the PUSCH transmission that is performed by the terminal. The ending symbol is configured to indicate an ending symbol of the PUSCH transmission that is performed by the terminal.

In another possible implementation, the time domain resource is at least one slot, and a scheduling mode of the time domain resource is scheduling based on each slot.

In another possible implementation, the starting symbol of the time domain resource is set for a first one or each one of the at least one slot. In this case, there can be one starting symbol or multiple starting symbols.

In another possible implementation, the ending symbol of the time domain resource is set for a last one or each one of the at least one slot. In this case, there can be one ending symbol.

In another possible implementation, the DCI signaling is further configured to indicate N redundancy versions (RVs). The terminal uses a respective RV to perform the PUSCH transmission in each slot of the time domain resource. That is, transmitted content in each slot contains complete PUSCH data information. Due to the LBT (Listen Before Talk), it is unknown in which slot, the terminal may detect that the channel is idle. For example, it can be detected only before a last slot that the channel is idle. In this case, the PUSCH transmission only needs to be performed in the last slot. The base station can correctly obtain the data information by receiving and decoding the content in this slot. If it is detected before the last three slots that the channel is idle, the PUSCH transmission can be performed in the last three slots. The base station can combine and decode received PUSCH data information of the last three slots to improve reception accuracy.

N is the number of the slots in the time domain resource indicated by the DCI signaling.

In another possible implementation, the time domain resource is at least one mini-slot, and the scheduling mode of the time domain resource is scheduling based on each mini-slot.

In another possible implementation, the starting symbol of the time domain resource is set for a first mini-slot or each mini-slot, and the DCI signaling is further configured to indicate the number of symbols included in each mini-slot.

In another possible implementation, the starting symbol of the time domain resource is set for each mini-slot, and an adjacent symbol before the starting symbol of an $S^{th}$ mini-slot is the ending symbol of a $(S-1)^{th}$ mini-slot.

It is to be noted that all symbols in a mini-slot are in the same slot.

In another possible implementation, the DCI signaling is further configured to indicate M redundancy versions (RVs). The terminal uses a respective RV to perform the PUSCH transmission in each mini-slot of the time domain resource. That is, transmitted content in each mini-slot contains complete PUSCH data information. Due to the LBT, it is unknown in which mini-slot, the terminal may detect that the channel is idle. For example, it can be detected only before a last mini-slot that the channel is idle. In this case, the PUSCH transmission only needs to be performed in the last mini-slot. The base station can correctly obtain the data information by receiving and decoding the content of this mini-slot. If it is detected before the last three mini-slots that the channel is idle, the PUSCH transmission can be performed in the last three mini-slots. The base station can combine and decode received PUSCH data information of the last three mini-slots to improve reception accuracy.

M is the number of the mini-slots in the time domain resource indicated by the DCI signaling.

In another possible implementation, the time domain resource is at least one slot and at least one mini-slot, and the scheduling mode of the time domain resource includes scheduling based on each slot for the at least one slot and scheduling based on at least one mini-slot for the at least one mini-slot.

In another possible implementation, the starting symbol of the time domain resource is set for each one or a first one of the at least one slot, and/or for a first one or each one of the least one mini-slot.

In another possible implementation, the ending symbol of the time domain resource is set for each one or a last one of the at least one slot, and/or for each one of the at least one mini-slot.

In another possible implementation, the DCI signaling is further configured to indicate K redundancy version (RVs). The terminal uses a respective RV to perform the PUSCH transmission in each slot and each mini-slot of the time domain resource. Considering that transmitted content in each slot or mini-slot contains complete PUSCH data information, due to the LBT, it is unknown in which slot or mini-slot, the terminal may monitor that the channel is idle. For example, it can be monitored only before a last slot that the channel is idle. In this case, the PUSCH transmission only needs to be performed in the last slot. The base station can correctly obtain the data information by receiving and decoding the content of this slot. If it is detected before the last mini-slot and four slots that the channel is idle, the PUSCH transmission can be performed in the last mini-slot and the four slots. The base station can combine and decode received PUSCH data information of the last mini-slot and the four slots to improve reception accuracy.

K is the number of the slots and the mini-slots in the time domain resource indicated by the DCI signaling.

In another possible implementation, a position near the starting symbol of PUSCH transmission in each slot or mini-slot is PUSCH transmission starting position.

In another possible implementation, the position near the starting symbol of PUSCH transmission in each slot or mini-slot being the PUSCH transmission starting position includes one of the following.

The starting symbol of the PUSCH transmission in each slot or mini-slot is the PUSCH transmission starting position.

A position away from and after the starting symbol of PUSCH transmission by a preset duration in each slot or mini-slot is the PUSCH transmission starting position.

A position away from and after the starting symbol of the PUSCH transmission by a preset duration plus a timing advance (TA) in each slot or mini-slot is the PUSCH transmission starting position.

A starting position of an adjacent symbol after the starting symbol of PUSCH transmission in each slot or mini-slot is the PUSCH transmission starting position.

In another possible implementation, the method further includes transmitting control signaling by the base station.

The control signaling is configured to indicate a stopping position of the LBT monitoring performed by the terminal. The control signaling includes one or a combination of RRC (radio resource control) signaling, MAC (media access control) signaling, and the DCI signaling.

In another possible implementation, each slot includes 14 symbols, and the starting symbol is any one of the 14 symbols.

In another possible implementation, in a case where the scheduling mode of the time domain resources is scheduling based on each slot, each slot has at least one starting symbol.

All the above-mentioned optional technical solutions can be combined in any way to form optional embodiments of the disclosure, which will not be repeated here.

Figure 3:
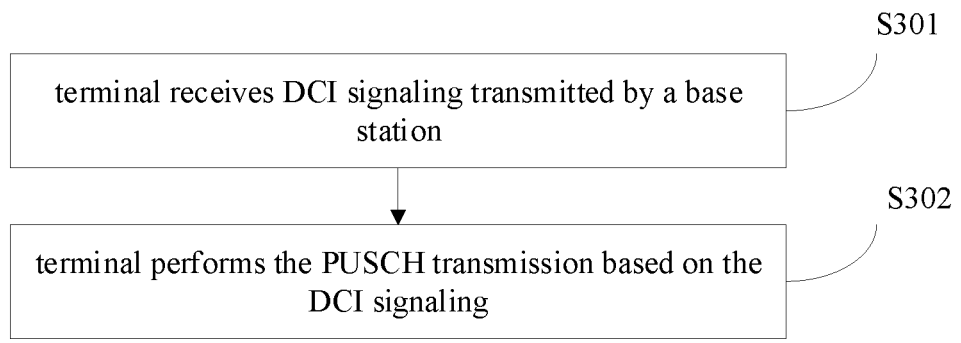
FIG. 3 is a flowchart illustrating a method for transmitting data according to some embodiments.

FIG. 3 is a flowchart illustrating a method for transmitting data according to some embodiments. As illustrated in FIG. 3, the method for transmitting data is applied to a base station and includes the following.

In block S301, the terminal receives the DCI signaling transmitted by a base station.

The DCI signaling is configured to indicate a time domain resource used by the terminal for the PUSCH transmission. The time domain resource includes at least one slot and/or at least one mini-slot.

In block S302, the terminal performs the PUSCH transmission based on the DCI signaling.

With the method according to embodiments of the disclosure, the terminal receives the DCI signaling and performs the PUSCH transmission based on the DCI signaling. The allocation of the time domain resources in the NR-U scenario is realized, and a success rate of uplink transmission and spectrum efficiency are improved.

In another possible implementation, the DCI signaling is further configured to indicate a starting symbol and/or an ending symbol of the time domain resource.

The terminal performing the PUSCH transmission based on the DCI signaling includes the terminal determining a starting symbol of the PUSCH transmission based on the starting symbol, and/or determine an ending symbol of the PUSCH transmission based on the ending symbol.

In another possible implementation, the time domain resource is at least one slot, and a scheduling mode of the time domain resource is scheduling based on each slot.

In another possible implementation, the starting symbol of the time domain resource is set for a first one or each one of the at least one slot.

In another possible implementation, the ending symbol of the time domain resource is set for a last one or each one of the at least one slot.

In another possible implementation, the DCI signaling is further configured to indicate N redundancy versions (RVs).

The terminal performing the PUSCH transmission based on the DCI signaling includes the terminal using a respective RV to perform the PUSCH transmission in each slot of the time domain resource.

N is the number of the slots in the time domain resource indicated by the DCI signaling.

In another possible implementation, the time domain resource is at least one mini-slot, and the scheduling mode of the time domain resource is scheduling based on each mini-slot.

In another possible implementation, the starting symbol of the time domain resource is set for a first one or each one of the at least one mini-slot. The DCI signaling is further configured to indicate the number of symbols included in each mini-slot.

In another possible implementation, the starting symbol of the time domain resource is set for each mini-slot, and an adjacent symbol before the starting symbol of an $S^{th}$ mini-slot is the ending symbol of a $(S-1)^{th}$ mini-slot.

In another possible implementation, the DCI signaling is further configured to indicate M redundancy versions (RVs).

The terminal performing the PUSCH transmission based on the DCI signaling includes the terminal using a respective RV to perform the PUSCH transmission in each mini-slot of the time domain resource.

M is the number of the mini-slots in the time domain resource indicated by the DCI signaling.

In another possible implementation, the time domain resource is at least one slot and at least one mini-slot, and the scheduling mode of the time domain resource includes scheduling based on each slot for the at least one slot and scheduling based on each mini-slot for the at least one mini-slot.

In another possible implementation, the starting symbol of the time domain resource is set for each one or a first one of the at least one slot, and/or for a first one or each one of the at least one mini-slot.

In another possible implementation, the ending symbol of the time domain resource is set for each one or a last one of the at least one slot, and/or for each one of the at least one mini-slot.

In another possible implementation, the DCI signaling is further configured to indicate K redundancy versions (RVs).

The terminal performing the PUSCH transmission based on the DCI signaling includes the terminal using a respective RV to perform the PUSCH transmission in each slot and mini-slot of the time domain resource.

K is the number of slots and mini-slots in the time domain resource indicated by the DCI signaling.

In another possible implementation, a position near the starting symbol of PUSCH transmission in each slot or mini-slot is PUSCH transmission starting position.

In another possible implementation, the terminal performing the PUSCH transmission based on the DCI signaling includes one of the following.

The terminal performs the PUSCH transmission by taking the starting symbol of PUSCH transmission in each slot or mini-slot as the PUSCH transmission starting position.

The terminal performs the PUSCH transmission by taking a position away from and after the starting symbol of PUSCH transmission by a preset duration in each slot or mini-slot as the PUSCH transmission starting position.

The terminal performs the PUSCH transmission by taking a position away from and after the starting symbol of PUSCH transmission by a preset duration plus the TA in each slot or mini-slot as the PUSCH transmission starting position.

The terminal performs the PUSCH transmission by taking a starting position of an adjacent symbol after the starting symbol of PUSCH transmission in each slot or mini-slot as the PUSCH transmission starting position.

In another possible implementation, the method further includes the terminal receiving control signaling sent by the base station.

The control signaling is configured to indicate a stopping position of the LBT monitoring performed by the terminal. The control signaling includes one or a combination of RRC (radio resource control) signaling, MAC (media access control) signaling, and the DCI signaling.

In addition, the method further includes the terminal obtaining the stopping position of the LBT monitoring from a chip.

In another possible implementation, each slot includes 14 symbols, and the starting symbol is any one of the 14 symbols.

All the above-mentioned optional technical solutions can be combined in any way to form optional embodiments of the disclosure, which will not be repeated here.

Figure 4:
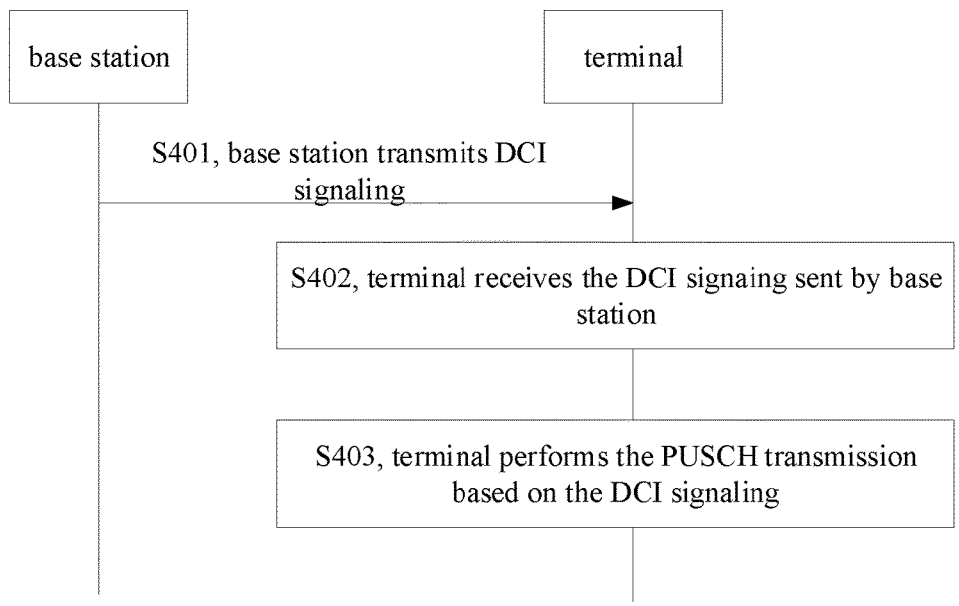
FIG. 4 is a flowchart illustrating another method for allocating time domain resources and transmitting data according to some embodiments.

FIG. 4 is a flowchart illustrating a method for allocating time domain resources and for transmitting data according to some embodiments. As illustrated in FIG. 4, the method for allocating time domain resources and for transmitting data is applied to a terminal and includes the following.

In block S401, the base station transmits the DCI signaling.

Figure 5:
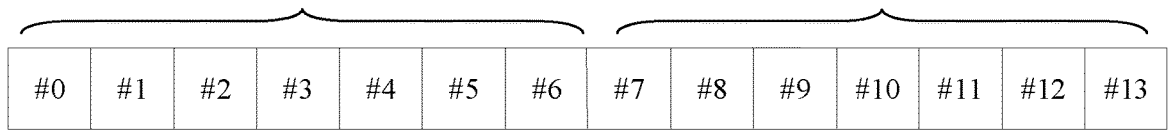
FIG. 5 is a schematic diagram illustrating a slot according to some embodiments.
Figure 6:
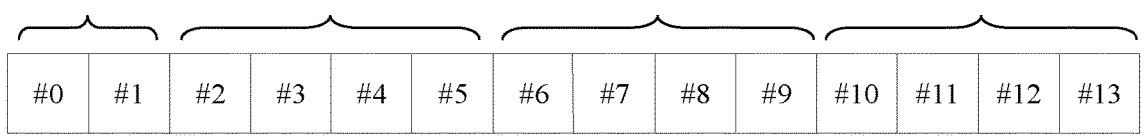
FIG. 6 is a schematic diagram illustrating another slot according to some embodiments.
Figure 7:
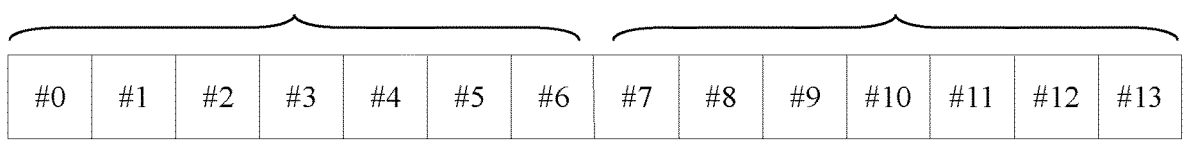
FIG. 7 is a schematic diagram illustrating still another slot according to some embodiments.
Figure 7:

The DCI signaling is configured to indicate the time domain resource used by the terminal for the PUSCH transmission. The time domain resource may include at least one slot, or at least one mini-slot, or both at least one slot and at least one mini-slot. Each slot includes 14 symbols which can be represented by numbers 0 to 13. Each slot can include at least two mini-slots. The length of each mini-slot may be the same or different. As illustrated in FIG. 5, a slot includes two mini-slots, and each mini-slot has a length of 7 symbols. A first mini-slot includes symbols #0 to #6, and a second mini-slot includes symbols #7 to #13. As illustrated in FIG. 6, a slot includes four mini-slots, the length of a first mini-slot is 2 symbols including symbol #0 and symbol #1, a length of a second mini-slot is 4 symbols including symbol #2 to symbol #5, a length of a third mini-slot is 4 symbols including symbol #6 to symbol #9, and a length of a fourth mini-slot is 4 symbols including symbol #10 to symbol #13. For transmitting the data, the PUSCH of the NR-U supports both the slot-based data transmission and the mini-slot-based data transmission. Therefore, the scheduling mode of time domain resource includes scheduling based on each slot, scheduling based on each mini-slot, or scheduling based on each slot and mini-slot.

In another possible implementation, the DCI signaling is further configured to indicate the starting symbol, the ending symbol, or both the starting symbol and the ending symbol of the time domain resource. The starting symbol is configured to indicate a starting symbol of the PUSCH transmission performed by the terminal. The starting symbol is any one of 14 symbols. The ending symbol is configured to indicate an ending symbols of the PUSCH transmission performed by the terminal.

According to different time domain resources and different scheduling modes of time domain resources, the starting symbol, the ending symbol, or both the starting symbol and the ending symbol indicated by the DCI signaling have different definitions, including the following cases.

In a first case, the time domain resource is at least one slot, and the scheduling mode of the time domain resource is scheduling based on each slot.

For the first case, the starting symbol of the time domain resource is set for a first one or each one of the at least one slot. The ending symbol of the time domain resource is set for a last one or each one of the at least one slot. That is, the starting symbol of the time domain resource may be set for the first slot of the at least one slot and the ending symbol may be set for the last slot of the at least one slot, or the starting symbol of the time domain resource may be set for the first slot of the at least one slot and the ending symbol may be set for each slot of the at least one slot, or the starting symbol of the time domain resource may be set for each slot of the at least one slot and the ending symbol may be set for each slot of the at least one slot, or the starting symbol of the time domain resource may be set for each slot of the at least one slot and the ending symbol may be set for the last slot of the at least one slot.

In a possible implementation, there may be only one starting symbol of the time domain resource.

As an example, the time domain resource includes four slots, the starting symbol is symbol #7 set for only the first slot, and the ending symbol is symbol #8 set for only the fourth slot. In this case, the symbol #7 of the first slot to the symbol #8 of the fourth slot are time domain resources allocated to the terminal for performing the PUSCH transmission. For example, the time domain resources include symbol #7 to symbol #13 of the first slot, symbol #0 to symbol #13 of the second slot, symbol #0 to symbol #13 of the third slot, and symbol #0 to symbol #8 of the fourth slot.

As another example, the time domain resource includes four slots, the starting symbol is symbol 0 set for each slot, and the ending symbol is symbol 6 set for each slot. In this case, symbol #0 to symbol #6 of each slot are time domain resources allocated to the terminal for performing the PUSCH transmission. For example, the time domain resources include symbol #0 to symbol #6 of the first slot, symbol #0 to symbol #6 of the second slot, symbol #0 to symbol #6 of the third slot, and symbol #0 to symbol #6 of the fourth slot.

As still another example, the time domain resource includes four slots, the starting symbol is symbol #7 set for only the first slot, and the ending symbol is symbol #12 set for each slot. In this case, symbol #7 to symbol #12 of the first slot, symbol #0 to symbol #12 of the second slot, symbol #0 to symbol #12 of the third slot, and symbol #0 to symbol #12 of the fourth slot are time domain resources allocated to the terminal for performing the PUSCH transmission.

As yet another example, the time domain resource includes four slots, the starting symbol is symbol #7 set for each slot, and the ending symbol is symbol #12 set for only the last slot. In this case, symbol #7 to symbol #13 of the first slot, symbol #7 to symbol #13 of the second slot, symbol #7 to symbol #13 of the third slot, and symbol #7 to symbol #12 of the fourth slot are time domain resources allocated to the terminal for performing the PUSCH transmission.

In another possible implementation, there may also be multiple starting symbols in the time domain resource, and the multiple starting symbols may be all set for the first slot, or may be all set for each slot. For example, a slot has 14 symbols including two starting symbols, i.e., symbol #0 and symbol #7, In a case where multiple starting symbols are all set for only the first slot, only the first slot has two symbols, i.e., symbol #0 and symbol #7, and the starting symbols of other slots are symbol #0. In a case where multiple starting symbols are all set for each slot, each slot has two starting symbols, i.e., symbol #0 and symbol #7. For a slot having two starting symbols such as symbol #0 and symbol #7, if the terminal detects before the symbol #0 that the channel is idle, the terminal transmits the complete PUSCH data information; and if the terminal does not detect before the symbol #0 that the channel is idle but the terminal detects before the symbol #7 that the channel is idle, the terminal can only transmit data corresponding to symbol #7 to the ending symbol, e.g., the symbol #13, and since data corresponding to symbols #0 to #6 cannot be used by the channel, the data is punctured. In this case, the DCI signaling is further configured to instruct N RVs and the terminal performs the PUSCH transmission using a respective RV in each slot of the time domain resource. N is the number of slots in the time domain resource indicated by the DCI signaling. That is, when the PUSCH transmission is performed in multiple slots, the number of PUSCHs is the same as the number of slots, and the terminal uses respective RVs to perform the PUSCH transmission in the N slots of the time domain resource.

Considering that the transmitted content of each slot contains the complete PUSCH data information, but the data information of each slot corresponding to a different RV, due to the LBT, it is known in which slot, the terminal may detect that the channel is idle. For example, when it is detected only before a last slot that the channel is idle, the PUSCH transmission only needs to be performed in the last slot. The base station can correctly obtain the data information by receiving and decoding the content of this slot. When it is detected before the last three slots that the channel is idle, the PUSCH transmission can be performed in the last three slots. The base station can combine and decode received PUSCH data information of the last three slots to improve reception accuracy.

In a second case, the time domain resource is at least one mini-slot, and the scheduling mode of the time domain resource is scheduling based on each mini-slot.

In this case, the starting symbol of the time domain resource can be set for a first mini-slot or each mini-slot. The DCI signaling is further configured to indicate the number of symbols included in each mini-slot. The number of symbols included in each mini-slot indicated by the DCI signaling may be the same or different.

As an example, the starting symbol of the time domain resource is set for the first mini-slot, and the DCI indicates one value for the number of symbols included in each mini-slot. In this case, the time domain resource includes N mini-slots, the numbers of symbols included in the mini-slots are the same, and the mini-slots are consecutive. For example, the starting symbol of the first mini-slot is symbol #0, and the number of symbols included in each mini-slot indicated by the DCI signaling is 3. That is, the first mini-slot contains symbols #0 to #2, the second mini-slot contains symbols #3 to #5, the third mini-slot contains symbols #6 to #8, and the fourth mini-slot contains symbols #9 to #11.

As another example, the starting symbol of the time domain resource is set for the first mini-slot, and the DCI indicates multiple values for the number of symbols included in the mini-slots. In this case, the time domain resource includes N mini-slots, the numbers of symbols included in the mini-slots are different, and the mini-slots are consecutive. For example, the starting symbol of the first mini-slot is symbol #0, and the numbers of the symbols in the mini-slots indicated by the DCI signaling are 2, 4, 4, 4 respectively for the mini-slots. That is, the first mini-slot contains symbols #0 and #1, the second mini-slot contains symbols #2 to #5, and the third mini-slot contains symbols #6 to #9, The fourth mini-slot contains symbols #10 to #13.

As still another example, the starting symbol of the time domain resource is set for each mini-slot, and the DCI indicates one value for the number of symbols included in each mini-slot. In this case, the time domain resource can include N mini-slots, the numbers of symbols in the mini-slots are the same, and the mini-slots can be inconsecutive. For example, the starting symbols of the mini-slots are symbol #0, symbol #3, symbol #7, and symbol #10 respectively, and the number of symbols included in each mini-slot indicated by the DCI signaling is 3. That is, the first mini-slot contains symbols #0 to #2, the second mini-slot contains symbols #3 to #5, the third mini-slot contains symbols #7 to #9, and the fourth mini-slot contains symbols #10 to #12. In this case, there is no continuity between the second mini-slot and the third mini-slot, i.e., the second and third mini-slots are spaced by the symbol #6.

As yet another example, the starting symbol of the time domain resource is set for each mini-slot, and the DCI indicates multiple value for the number of symbols included in the mini-slots. In this case, the time domain resource can include N mini-slots, the numbers of symbols included in the mini-slots are different, and the mini-slots are inconsecutive. For example, the starting symbols of the mini-slots are symbol #0, symbol #3, symbol #7, symbol #10 respectively, and the numbers of symbols in the mini-slots indicated by the DCI signaling are 2, 3, 3, 4 respectively. That is, the first mini-slot contains symbols #0 and #1, the second mini-slot contains symbols #3 to #5, the third mini-slot contains symbols #7 to #9, and the fourth mini-slot contains symbols #10 to #13.

The starting symbol of the time domain resource may also be set for each mini-slot, and an adjacent symbol before the starting symbol of an $S^{th}$ mini-slot is the ending symbol of a $(S-1)^{th}$ mini-slot. The value of S ranges from 1 to M, where M is the number of the mini-slots in the time domain resource. For example, the time domain resource includes one slot, and the slot includes 4 mini-slots. In this case, it only needs to set starting symbols for the four mini-slots, the adjacent symbol before the starting symbol of the second mini-slot is the ending symbol of the first mini-slot, the adjacent symbol before the starting symbol of the third mini-slot is the ending symbol of the second mini-slot, and the adjacent symbol before the starting symbol of the fourth mini-slot is the ending symbol of the third mini-slot.

For example, the time domain resource indicates multiple starting symbols, for example 4 starting symbols, i.e., symbol #0, symbol #3, symbol #7, symbol #10. That is, the first mini-slot contains symbol #0 to #2, the second mini-slot contains symbols #3 to #6, the third mini-slot contains symbols #7 to #9, and the fourth mini-slot contains symbols #10 to #13. In this case, these mini-slots are consecutive.

In this case, the DCI signaling is further configured to indicate M RVs and the terminal performs the PUSCH transmission using a respective RV in each mini-slot of the time domain resource, where M is the number of mini-slots in the time domain resource indicated by the DCI signaling. That is, when multiple PUSCHs are transmitted in multiple mini-slots, each mini-slot transmits one PUSCH, the number of PUSCHs is the same as the number of mini-slots, and there is a one-to-one correspondence between the PUSCHs and the mini-slots. The terminal uses a corresponding RV to perform the PUSCH transmission in each mini-slot of the time domain resource.

The transmitted content of each mini-slot contains the complete PUSCH data information, but the data information of each mini-slot corresponds to a different RV. Due to the LBT, it is unknown in which mini-slot, the terminal may detect that the channel is idle. For example, if it is detected only before a last mini-slot that the channel is idle, the PUSCH transmission only needs to be performed in the last mini-slot using the corresponding RV. The base station can correctly obtain the data information by receiving and decoding the content of the last mini-slot. If it is detected before the last three mini-slots that the channel is idle, the PUSCH transmission is performed using corresponding RVs in the last three mini-slots. The base station can combine and decode received PUSCH data information of the last three mini-slots to improve reception accuracy.

In a third case, the time domain resource is at least one slot and at least one mini-slot. The scheduling mode of time domain resource includes scheduling based on each slot for the at least one slot and scheduling based on each mini-slot for the at least one mini-slot.

In this case, the starting symbol of the time domain resource is set for each one or a first one of the at least one slot, and/or a first one or each one of the at least one mini-slot. The ending symbol of the time domain resource is set for each one or a last one of the at least one slot, and/or each one of the at least one mini-slot. That is, for the at least one slot, the starting symbol of the time domain resource may be set for the first slot of the at least one slot and the ending symbol may be set for the last slot of the at least one slot, or the starting symbol of the time domain resource may be set for the first slot of the at least one slot and the ending symbol may be set for each slot of the at least one slot, or the starting symbol of the time domain resource may be set for each slot of the at least one slot and the ending symbol may be set for the last slot of the at least one slot, or the starting symbol of the time domain resource may be set for each slot of the at least one slot and the ending symbol may be set for each slot of the at least one slot. For the at least one mini-slot, the starting symbol of the time domain resource can be set for each mini-slot of the at least one mini-slot and the ending symbol can be set for each mini-slot of the at least one mini-slot, or the starting symbol of the time-domain resource can be set for the first mini-slot of the at least one mini-slot and the ending symbol can be set for each mini-slot of the at least one mini-slot.

For example, the time domain resource includes four mini-slots and four slots. The four mini-slots are all in a slot #0. The four slots are slot #1, slot #2, slot #3, and slot #4.

For the four mini-slots, in an implementation, the starting symbol of the time domain resource can be set for the first mini-slot or each mini-slot. The DCI signaling is further configured to indicate the number of symbols included in each mini-slot. The numbers of symbols included in the mini-slots indicated by the DCI signaling may be the same or different.

As an example, the starting symbol of the time domain resource is set for the first mini-slot, and the DCI signaling indicates one value for the numbers of symbols included in the mini-slots. In this case, the time domain resource includes N mini-slots, the numbers of symbols included in the mini-slots are the same, and the mini-slots are consecutive. For example, the starting symbol of the first mini-slot is symbol #0, and the numbers of symbols included in the mini-slots indicated by the DCI signaling are all 3. That is, the first mini-slot contains symbols #0 to #2, the second mini-slot contains symbols #3 to #5, the third mini-slot contains symbols #6 to #8, and the fourth mini-slot contains symbols #9 to #11.

As another example, the starting symbol of the time domain resource is set for the first mini-slot, and the DCI signaling indicates multiple values for the numbers of symbols included in the mini-slots. In this case, the time domain resource includes N mini-slots, the mini-slots includes different numbers of symbols, and the mini-slots are consecutive. For example, the starting symbol of the first mini-slot is the symbol #0, and the numbers of symbols included in the mini-slots indicated by the DCI signaling are 2, 4, 4, 4 respectively. That is, the first mini-slot contains symbols #0 and #1, the second mini-slot contains symbols #2 to #5, and the third mini-slot contains symbols #6 to #9, and the fourth mini-slot contains symbols #10 to #13.

As still another example, the starting symbol of the time domain resource is set for each mini-slot, and the DCI signaling indicates one value for the numbers of symbols included in the mini-slots. In this case, the time domain resource can include N mini-slots, each mini-slot includes the same number of symbols, and the mini-slots are inconsecutive. For example, the starting symbols of the mini-slots are symbol #0, symbol #3, symbol #7, symbol #10 respectively, and the DCI signaling indicates that the numbers of symbols included in the mini-slots are all 3. That is, the first mini-slot contains symbols #0 to #2, the second mini-slot contains symbols #3 to #5, the third mini-slot contains symbols #7 to #9, and the fourth mini-slot contains symbols #10 to #12. In this case, there is no continuity between the second mini-slot and the third mini-slot, i.e., there is the symbol #6 between the second and the third mini-slots.

As yet another example, the starting symbol of the time domain resource is set for each mini-slot, and the DCI signaling indicates multiple values for the numbers of symbols included in the mini-slots. In this case, the time domain resource can include N mini-slots, the mini-slots include different numbers of symbols, and the mini-slots are inconsecutive. For example, the starting symbol of each mini-slot is symbol #0, symbol #3, symbol #7, symbol #10 respectively, and the number of symbols included in each mini-slot indicated by the DCI signaling is 2, 3, 3, 4 respectively. That is, the first mini-slot contains symbols #0 and #1, the second mini-slot contains symbols #3 to #5, the third mini-slot contains symbols #7 to #9, and the fourth mini-slot contains symbols #10 to #13.

For the four mini-slots, in another implementation, the starting symbol of the time domain resource can be set for each mini-slot. In this case, an adjacent symbol before the starting symbol of an $S^{th}$ mini-slot is the ending symbol of a $(S-1)^t$ mini-slot. The value of S ranges from 1 to M, where M is the number of mini-slots in the time domain resource. For example, the time domain resource includes one slot, and the slot includes 4 mini-slots. It only needs to set starting symbols for the four mini-slots, the adjacent symbol before the starting symbol of the second mini-slot is the ending symbol of the first mini-slot, the adjacent symbol before the starting symbol of the third mini-slot is the ending symbol of the second mini-slot, and the adjacent symbol before the starting symbol of the fourth mini-slot is the ending symbol of the third mini-slot.

For example, the time domain resource only gives multiple starting symbols, e.g., 4 starting symbols, symbol #0, symbol #3, symbol #7, symbol #10. That is, the first mini-slot contains symbols #0 to #2, the second mini-slot contains symbols #3 to #6, the third mini-slot contains symbols #7 to #9, and the fourth mini-slot contains symbols #10 to #13. In this case, these mini-slots are consecutive.

For the four mini-slots, in another implementation, the starting symbol of the time domain resource may be set for each mini-slot and the ending symbol of the time domain resource may be set for each mini-slot. In this case, the time domain resource may include N mini-slots, the numbers of symbols included in the mini-slots may be different, and the s mini-slots may be inconsecutive. For example, the starting symbol of each mini-slot is symbol #0, symbol #3, symbol #7, and symbol #10 respectively, and the ending symbol of each mini-slot is symbol #1, symbol #5, symbol #9, and symbol #13 respectively. That is, the first mini-slot contains symbols #0 and #1, the second mini-slot contains symbols #3 to #5, the third mini-slot contains symbols #7 to #9, and the fourth mini-slot contains symbols #10 to #13.

For the four slots, in a possible implementation, there may be only one starting symbol of the time domain resource.

As an example, the time domain resource includes four slots, the starting symbol is symbol #7 set for only the first slot, and the ending symbol is symbol #8 set for only the fourth slot. In this case, the symbol #7 of the first slot to the symbol #8 of the fourth slot are time domain resources allocated to the terminal for performing the PUSCH transmission. The time domain resources include symbol #7 to symbol #13 of the first slot, symbol #0 to symbol #13 of the second slot, the symbol #0 to symbol #13 of the third slot, and symbol #0 to symbol #8 of the fourth slot.

As another example, the time domain resource includes four slots, the starting symbol is symbol #0 set for each slot, and the ending symbol is symbol #6 set for each slot. In this case, symbol #0 to symbol #6 of each slot are time domain resources allocated to the terminal for performing the PUSCH transmission. The time domain resources include symbol #0 to symbol #6 of the first slot, symbol #0 to symbol #6 of the second slot, and symbol #0 to symbol #6 of the third slot, and symbol #0 to symbol #6 of the fourth slot.

As still another example, the time domain resource includes four slots, the starting symbol is symbol #7 set for only the first slot, and the ending symbol is symbol #12 set for each slot. In this case, symbol #7 to symbol #12 of the first slot, symbol #0 to symbol #12 of the second slot, symbol #0 to symbol #12 of the third slot, and symbol #0 to symbol #12 of the fourth slot are time domain resources allocated to the terminal for performing the PUSCH transmission.

As yet another example, the time domain resource includes four slots, the starting symbol is symbol #7 set for each slot, and the ending symbol is symbol #12 set for only the last slot. In this case, symbol #7 to symbol #13 of the first slot, symbol #7 to symbol #13 of the second slot, symbol #7 to symbol #13 of the third slot, and symbol #7 to symbol #12 of the fourth slot are time domain resources allocated to the terminal for performing the PUSCH transmission.

For the four slots, in another possible implementation, there can be multiple starting symbols of the time domain resource, and these multiple starting symbols can be all set for the first slot or can be all set for each slot. For example, a slot includes 14 symbols, and two starting symbols are symbol #0 and symbol #7. When the multiple starting symbols are all set for only the first slot, only the first slot has two starting symbols, i.e., the symbol #0 and the symbol #7, and the starting symbols of other slots are both the symbol #0. When the multiple starting symbols are all set for each slot, each slot has two starting symbols, i.e., the symbol #0 and the symbol #7. For a slot having two starting symbols such as the symbol #0 and the symbol #7, when it is detected by the terminal before the symbol #0 that the channel is idle, the terminal transmits the complete PUSCH data information, and when it is not detected by the terminal before the symbol #0 that the channel is idle and it is detected by the terminal before the symbol #7 that the channel is idle, the terminal transmits data corresponding to the symbol #7 to the ending symbol, such as the symbol #13, and since data corresponding to the symbols #0 to #6 cannot be used by the channel, the data is punctured.

In this case, the DCI signaling is further configured to indicate K RVs and the terminal performs the PUSCH transmission using a corresponding RV in each slot and mini-slot, where K is the number of slots and mini-slots in the time domain resource indicated by the DCI signaling. That is, one PUSCH is transmitted in each slot or mini-slot, the number of slots and mini-slots is the same as the number of PUSCHs, and the terminal uses a corresponding RV to perform the PUSCH transmission in each slot and mini-slot of the time domain resource.

Considering that the transmitted content of each slot or mini-slot contains the complete PUSCH data information, due to the LBT, it is unknown in which slot or mini-slot, the terminal may monitor that the channel is idle. For example, it is monitored only before the last slot that the channel is idle, and thus the PUSCH transmission only needs to be performed in the last slot. The base station can correctly obtain the data information by receiving and decoding the content of this slot. When it is detected before the last mini-slot and four slots that the channel is idle, the PUSCH transmission can be performed in the last mini-slot and four slots. The base station can combine and decode received PUSCH data information of the last one mini-slot and four slots to improve reception accuracy.

In another possible implementation, a position near the starting symbol of PUSCH transmission in each slot or mini-slot is a PUSCH transmission starting position. The PUSCH transmission starting position can include the following.

First type, the starting symbol of PUSCH transmission in each slot or mini-slot is the PUSCH transmission starting position.

Second type, a position away from and after the starting symbol of the PUSCH transmission by a preset duration in each slot or mini-slot is the PUSCH transmission starting position. The preset duration is set by the base station, such as 25 µs, 30 µs, etc.

Third type, a position away from and after the starting symbol of PUSCH transmission by a preset duration plus the TA in each slot or mini-slot is the PUSCH transmission starting position.

Fourth type, a starting position of an adjacent symbol after the starting symbol of the PUSCH transmission in each slot or mini-slot is the PUSCH transmission starting position.

If the starting symbol is i, the PUSCH transmission starting position can be one of the following:
a) symbol i;
b) 25 µs in symbol i;
c) (25+TA) µs in symbol i;
d) symbol i+1.

In order to distinguish the different PUSCH transmission starting positions, the base station can set different identifiers for different types of the PUSCH transmission starting position, such that the terminal can determine the PUSCH transmission starting position based on the identifiers. In detail, an identifier 00 can be set for the starting symbol of PUSCH transmission, an identifier 01 can be set for the position away from and after the starting symbol of PUSCH transmission by a preset duration, an identifier 10 can be set for the position away from and after the starting symbol of the PUSCH transmission by a preset duration plus TA, and an identifier 11 can be set for the starting position of the adjacent symbol of the starting symbol of PUSCH transmission.

As an example, if i is 0, the PUSCH transmission starting position can be shown in Table 1:

TABLE 1

| identifier | PUSCH transmission starting position |
|---|---|
| 00 | symbol 0 |
| 01 | 25 µs in symbol 0 |
| 10 | (25 + TA) µs in symbol 0 |
| 11 | symbol 1 |

As another example, if i is 7, the PUSCH transmission starting position can be shown in Table 2:

TABLE 2

| identifier | PUSCH transmission starting position |
|---|---|
| 00 | symbol 7 |
| 01 | 25 µs in symbol 7 |
| 10 | (25 + TA) µs in symbol 7 |
| 11 | symbol 8 |

Considering that the starting symbol can be any one of symbols 0 to 13, and thus the number of to-be-sent starting symbols is large, in order to reduce the number of to-be-sent starting symbols, the starting symbols can be limited. For example, the starting symbols are limited to symbol 0, symbol 2, symbol 4, symbol 7, symbol 8, symbol 9, or symbol 11, etc. A maximum ending symbol can be symbol 13.

In block S402, the terminal receives the DCI signaling sent by the base station.

In block S403, the terminal performs the PUSCH transmission based on DCI signaling.

Before performing the PUSCH transmission based on the DCI signaling, the terminal also needs to determine the stopping position of the LBT monitoring. The stopping position of the LBT monitoring refers to a position where the terminal performs the LBT monitoring for the last time. This position is before the starting symbol of the last slot or mini-slot. When it is not monitored before the starting symbol of last slot or mini-slot that the channel is idle, i.e., the channel is busy all the time, there is no need to continue the LBT monitoring, because even if it is monitored subsequently that the channel is idle, the remaining time is less than a complete transmission time unit, and thus the PUSCH transmission cannot be performed.

The terminal can obtain the stopping position of the LBT monitoring in the following two ways.

In a possible implementation, the terminal can receive control signaling sent by the base station. The control signaling is configured to indicate the stopping position of the LBT monitoring performed by the terminal. The control signaling includes one or a combination of RRC (radio resource control) signaling, MAC (media access control) signaling, and the DCI signaling.

In another possible implementation, the stopping position of the LBT monitoring is pre-stored in a chip of the terminal. Therefore, the terminal can obtain the stopping position of the LBT monitoring from the chip.

Based on the acquired stopping position of the LBT monitoring, manners in which the terminal performs the LBT monitoring are different for different scheduling modes of time domain resource.

In a possible implementation, when the time domain resource is at least one slot, and the scheduling mode of the time domain resource is scheduling based on each slot, the stopping position of the LBT monitoring is before the starting symbol of the last slot. In this case, the terminal performs the LBT monitoring before the starting symbol of the first slot (the time duration between performing the LBT monitoring and the starting symbol is not limited) until the starting symbol of the last slot. If it is monitored before the starting symbol of the last slot that the channel is idle, the terminal uses a corresponding RV to perform the PUSCH transmission in the last slot. If the channel is busy all the time until the starting symbol of the last slot, the LBT monitoring is stopped.

In another possible implementation, when the time domain resource is at least one mini-slot, and the scheduling mode of the time domain resource is scheduling based on each mini-slot, the stopping position of the LBT monitoring is the starting symbol of the last mini-slot. In this case, the terminal performs the LBT monitoring before the starting symbol of the first mini-slot until the starting symbol of the last mini-slot. If it is monitored before the starting symbol of the last mini-slot that the channel is idle, the terminal uses a corresponding RV to perform the PUSCH transmission in the last mini-slot. If it is monitored that the channel is busy all the time until the starting symbol of the last mini-slot, the LBT monitoring is stopped.

In another possible implementation, considering that the starting symbol can be any one of symbols 0 to 13, and thus the number of to-be-sent starting symbols is large, in order to reduce the number of to-be-sent starting symbols, the starting symbols can be limited. For example, the starting symbols are limited to symbol #0, symbol #2, symbol #4, symbol #7, symbol #8, symbol #9, or symbol #11. A maximum ending symbol can be symbol #13.

With the method according to embodiments of the disclosure, the base station transmits the DCI signaling and the DCI signaling indicates the time domain resource of the PUSCH transmission performed by the terminal. By proposing a new method for allocating time domain resource in the NR-U scenario, the success rate of uplink transmission and spectrum efficiency are improved.

Figure 8:
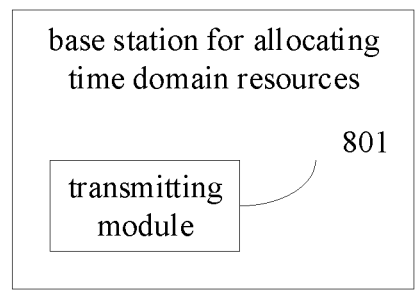
FIG. 8 is a block diagram illustrating a structure of a base station according to some embodiments.

FIG. 8 is a block diagram illustrating a base station for allocating time domain resource according to some embodiments. As illustrated in FIG. 8, the base station is the base station in FIG. 1 and includes a transmitting module 801.

The transmitting module 801 is configured to transmit DCI (downlink control information) signaling. The DCI signaling is configured to indicate a time domain resource used by the terminal for PUSCH (physical uplink shared channel) transmission. The time domain resources include at least one slot and/or at least one mini-slot.

In another possible implementation, the DCI signaling is further configured to indicate a starting symbol and/or an ending symbol of the time domain resource.

The starting symbol is configured to indicate a starting symbol of the PUSCH transmission performed by the terminal, and the ending symbol is configured to indicate an ending symbol of the PUSCH transmission performed by the terminal.

In another possible implementation, the time domain resource is at least one slot, and the scheduling mode of the time domain resource is scheduling based on each slot.

In another possible implementation, the starting symbol of the time domain resource is set for a first one or each one of the at least one slot; and/or the ending symbol of the time domain resource is set for a last one or each one of the at least one slot.

In another possible implementation, the DCI signaling is further configured to indicate N redundancy versions (RVs) and the terminal uses a corresponding RV to perform the PUSCH transmission in each slot of the time domain resource.

N is the number of the slots in the time domain resource indicated by the DCI signaling.

In another possible implementation, the time domain resource is at least one mini-slot, and the scheduling mode of the time domain resource is scheduling based on each mini-slot.

In another possible implementation, the starting symbol of the time domain resource is set for a first mini-slot or each mini-slot, and the DCI signaling is further configured to indicate the number of symbols included in each mini-slot; or, the starting symbol of the time domain resource is set for each mini-slot, and an adjacent symbol before the starting symbol of an $S^{th}$ mini-slot is the ending symbol of a $(S-1)^{th}$ mini-slot.

In another possible implementation, the DCI signaling is further configured to indicate M redundancy versions (RVs) and the terminal uses a corresponding RV to perform the PUSCH transmission in each mini-slot of the time domain resource.

M is the number of the mini-slots in the time domain resource indicated by the DCI signaling.

In another possible implementation, the time domain resource is at least one slot and at least one mini-slot, and the scheduling mode of the time domain resource includes scheduling based on each slot for the at least one slot and scheduling based on each mini-slot for the at least one mini-slot.

In another possible implementation, the starting symbol of the time domain resource is set for each one or a first one of the at least one slot, and/or each one or a first one of the at least one mini-slots; and/or, the ending symbol of the time domain resource is set for each one or a last one of the at least one slot, and/or each one of the at least one mini-slot.

In another possible implementation, the DCI signaling is further configured to indicate K redundancy versions (RVs) and the terminal performs the PUSCH transmission with a respective RV in each slot and mini-slot of the time domain resource.

K is the number of slots and mini-slots in the time domain resource indicated by the DCI signaling.

In another possible implementation, a position near the starting symbol of PUSCH transmission in each slot or mini-slot is the PUSCH transmission starting position.

In another possible implementation, the position near the starting symbol of PUSCH transmission in each slot or mini-slot being the PUSCH transmission starting position includes one of the following.

The starting symbol of PUSCH transmission in each slot or mini-slot is the PUSCH transmission starting position.

A position away from and after the starting symbol of PUSCH transmission by a preset duration in each slot or mini-slot is the PUSCH transmission starting position.

A position away from and after the starting symbol of PUSCH transmission by a preset duration plus a TA (timing advance) in each slot or mini-slot is the PUSCH transmission starting position.

A starting position of an adjacent symbol after the starting symbol of PUSCH transmission in each slot or mini-slot is the PUSCH transmission starting position.

In another possible implementation, the transmitting module 801 is configured to transmit control signaling. The control signaling is configured to indicate a stopping position of the LBT monitoring performed by the terminal. The control signaling includes one or a combination of RRC (radio resource control) signaling, MAC (media access control) signaling, and the DCI signaling.

In another possible implementation, each slot includes 14 symbols, and the starting symbol is any one of the 14 symbols.

In another possible implementation, when the scheduling mode of the time domain resources is scheduling based on each slot, and each slot has at least one starting symbol.

With the base station according to embodiments of the disclosure, the base station transmits the DCI signaling and indicates the time domain resource used by the terminal to perform the PUSCH transmission in the DCI signaling. A method for allocating time domain resources in a NR-U scenario is provided, and success rate of uplink transmission and spectrum efficiency are improved.

Regarding the base station in the foregoing embodiment, the specific manner in which each module performs operations has been described in detail in method embodiments, and detailed description will not be repeated here.

Figure 9:
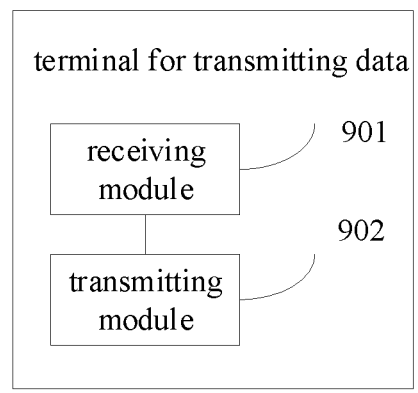
FIG. 9 is a block diagram illustrating a structure of a terminal according to some embodiments.

FIG. 9 is a block diagram illustrating a terminal for transmitting data according to some embodiments. As illustrated in FIG. 9, the terminal is the terminal in FIG. 1 and includes a receiving module 901 and a transmitting module 902.

The receiving module 901 is configured to receive DCI signaling transmitted by the base station. The DCI signaling is configured to indicate a time domain resource used by the terminal to perform PUSCH transmission. The time domain resource includes at least one slot and/or at least one mini-slot.

The transmitting module 902 is configured to perform the PUSCH transmission based on the DCI signaling.

In another possible implementation, the DCI signaling is further configured to indicate a starting symbol and/or an ending symbol of the time domain resource.

The transmitting module 902 is configured to determine a starting symbol of the PUSCH transmission based on the starting symbol, and/or determine an ending symbol of the PUSCH transmission based on the ending symbol.

In another possible implementation, the time domain resource is at least one slot, and the scheduling mode of the time domain resource is scheduling based on each slot.

In another possible implementation, the starting symbol of the time domain resource is set for a first one or each one of the at least one slot; and/or, the ending symbol of the time domain resource is set for a last or each one of the at least one slot.

In another possible implementation, the DCI signaling is further configured to indicate N redundancy versions (RVs).

The transmitting module 902 is configured to use a corresponding RV to perform the PUSCH transmission in each slot of the time domain resource.

N is the number of the slots in the time domain resource indicated by the DCI signaling.

In another possible implementation, the time domain resource is at least one mini-slot, and the scheduling mode of the time domain resource is scheduling based on each mini-slot.

In another possible implementation, the starting symbol of the time domain resource is set for a first mini-slot or each mini-slot, and the DCI signaling is further configured to indicate the number of symbols included in each mini-slot, or the starting symbol of the time domain resource is set for each mini-slot, and an adjacent symbol before the starting symbol of an $S^{th}$ mini-slot is the ending symbol of a $(S-1)^{th}$ mini-slot.

In another possible implementation, the DCI signaling is further configured to indicate M redundancy versions (RVs).

The transmitting module 902 is configured to use a corresponding RV to perform the PUSCH transmission in each mini-slot of the time domain resource.

M is the number of the mini-slots in the time domain resource indicated by the DCI signaling.

In another possible implementation, the time domain resource is at least one slot and at least one mini-slot, and the scheduling mode of the time domain resource includes scheduling based on each slot for the at least one slot and scheduling based on each mini-slot for the at least one mini-slot.

In another possible implementation, the starting symbol of the time domain resource is set for each one or a first one of the at least one slot, and/or a first one or each one of the at least one mini-slot; and/or, the ending symbol of the time domain resource is set for each one or a last one of the at least one slot, and/or each one of the at least one mini-slot.

In another possible implementation, the DCI signaling is further configured to indicate K redundancy versions (RVs).

The transmitting module 902 is configured to use a corresponding RV for performing the PUSCH transmission in each slot and mini-slot of the time domain resource.

K is the number of the slots and the mini-slots in the time domain resource indicated by the DCI signaling.

In another possible implementation, a position near the starting symbol of PUSCH transmission in each slot or mini-slot is the PUSCH transmission starting position.

In another possible implementation, the transmitting module 902 is configured to perform the PUSCH transmission by taking the starting symbol of PUSCH transmission in each slot or mini-slot as the PUSCH transmission starting position of, or the transmitting module 902 is configured to perform the PUSCH transmission by taking a position away from and after the starting symbol of PUSCH transmission in each slot or mini-slot by a preset duration as the PUSCH transmission starting position; or, the transmitting module 902 is configured to perform the PUSCH transmission by taking a position away from and after the starting symbol of PUSCH transmission in each slot or mini-slot by a preset duration plus the TA as the PUSCH transmission starting position; or, the transmitting module 902 is configured to perform the PUSCH transmission by taking a starting position of an adjacent symbol after the starting symbol of PUSCH transmission in each slot or mini-slot as the PUSCH transmission starting position.

In another possible implementation, the terminal further includes: an acquiring module.

The receiving module 901 is configured to receive control signaling sent by the base station. The control signaling is configured to indicate a stopping position of the LBT monitoring performed by the terminal. The control signaling includes one or a combination of RRC signaling, MAC signaling, and the DCI signaling.

The acquiring module is configured to acquire the stopping position of the LBT monitoring from a chip.

In another possible implementation, each slot includes 14 symbols, and the starting symbol is any one of the 14 symbols.

With the terminal according to embodiments of the disclosure, the terminal receives the DCI signaling and performs the PUSCH transmission based on the DCI signaling. The allocation of time domain resources in the NR-U scenario is realized, and the success rate of uplink communication and sequency spectrum are improved.

Figure 10:
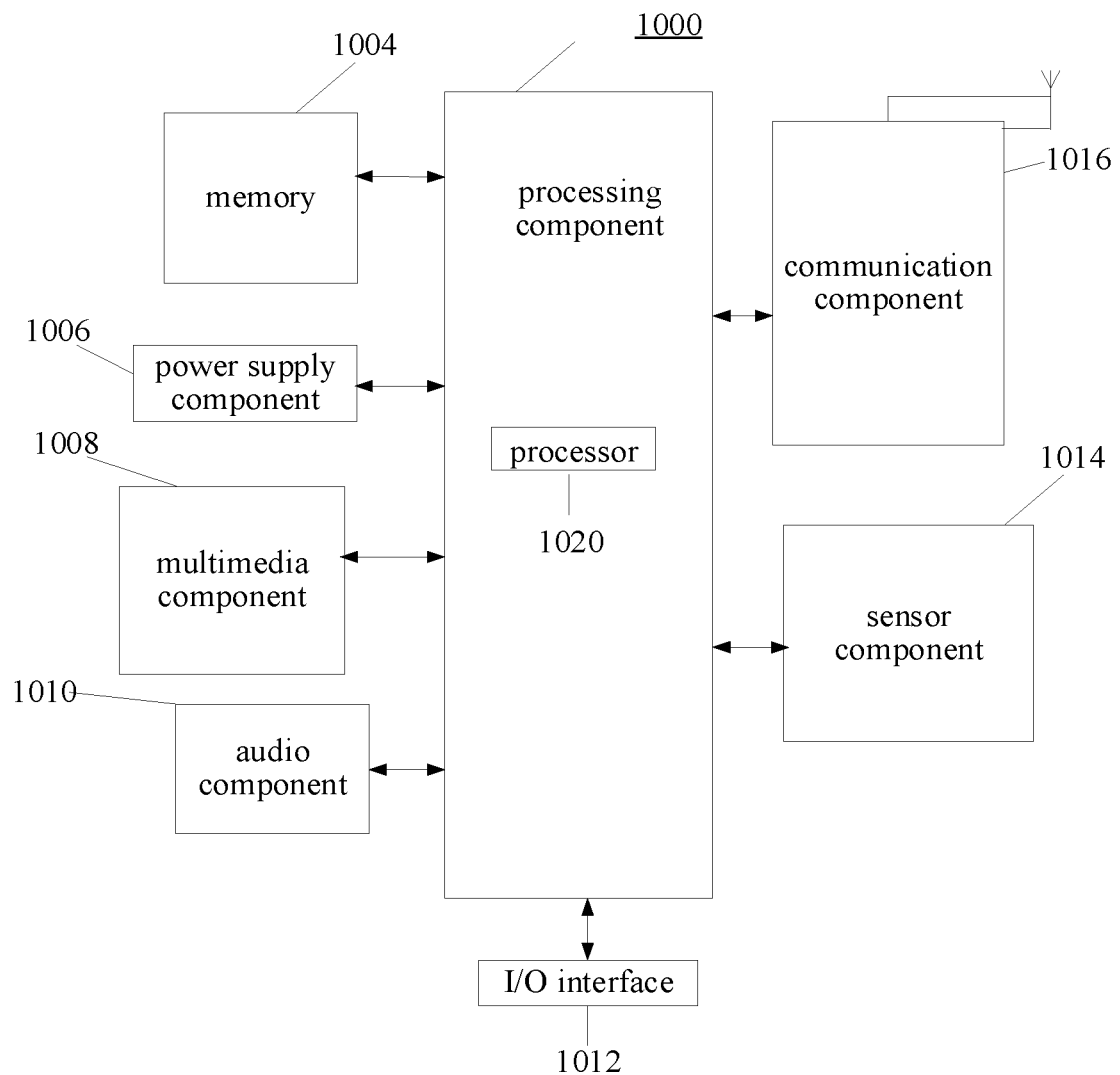
FIG. 10 is a block diagram illustrating a device for transmitting data according to some embodiments.

FIG. 10 is a block diagram illustrating a device 1000 for transmitting data according to some embodiments. For example, the device 1000 may be a mobile phone, a computer, a digital broadcasting device, a messaging device, a game console, a tablet device, a medical device, a fitness device, a personal digital assistant, etc.

As illustrated in FIG. 10, the device 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls the overall operations of the device 1000, such as operations associated with display, telephone calls, data communications, camera operations, and recording operations. The processing component 1002 may include one or more processors 1020 to execute instructions to complete all or part of the steps of the foregoing method. In addition, the processing component 1002 may include one or more modules to facilitate the interaction between the processing component 1002 and other components. For example, the processing component 1002 may include a multimedia module to facilitate the interaction between the multimedia component 1008 and the processing component 1002.

The memory 1004 is configured to store various types of data to support operations in the device 1000. Examples of these data include instructions for any application or method operated on the device 1000, contact data, phone book data, messages, pictures, videos, etc. The memory 1004 can be implemented by any type of volatile or non-volatile storage device or their combination, such as static random-access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power supply component 1006 provides power for various components of the device 1000. The power supply component 1006 may include a power management system, one or more power supplies, and other components associated with the generation, management, and distribution of power for the device 1000.ss The multimedia component 1008 includes a screen that provides an output interface between the device 1000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or sliding action, but also detect the duration and pressure related to the touch or sliding operation. In some embodiments, the multimedia component 1008 includes a front camera and/or a rear camera. When the device 1000 is in an operation mode, such as a shooting mode or a video mode, the front camera and/or the rear camera can receive external multimedia data. Each front camera and rear camera can be a fixed optical lens system or have focal length and optical zoom capabilities.

The audio component 1010 is configured to output and/or input audio signals. For example, the audio component 1010 includes a microphone (MIC). When the device 1000 is in an operation mode, such as a call mode, a recording mode, and a voice recognition mode, the microphone is configured to receive external audio signals. The received audio signal can be further stored in the memory 1004 or sent via the communication component 1016. In some embodiments, the audio component 1010 further includes a speaker for outputting audio signals.

The I/O interface 1012 provides an interface between the processing component 1002 and a peripheral interface module. The above-mentioned peripheral interface module may be a keyboard, a click wheel, a button, and the like. These buttons may include, but are not limited to, home button, volume button, start button, and lock button.

The sensor component 1014 includes one or more sensors for providing the device 1000 with various status assessments. For example, the sensor component 1014 can detect the open/close status of the device 1000 and the relative positioning of components. For example, the component is the display and the keypad of the device 1000. The sensor component 1014 can also detect the position change of the device 1000 or a component of the device 1000, the presence or absence of contact between the user and the device 1000, the orientation or acceleration/deceleration of the device 1000, and the temperature change of the device 1000. The sensor component 1014 may include a proximity sensor configured to detect the presence of nearby objects when there is no physical contact. The sensor component 1014 may also include a light sensor, such as a CMOS or CCD image sensor, for use in imaging applications. In some embodiments, the sensor component 1014 may also include an acceleration sensor, a gyroscope sensor, a magnetic sensor, a pressure sensor, or a temperature sensor.

The communication component 1016 is configured to facilitate wired or wireless communication between the device 1000 and other devices. The device 1000 can access a wireless network based on a communication standard, such as Wi-Fi, 2G, or 3G, or a combination thereof. In an exemplary embodiment, the communication component 1016 receives a broadcast signal or broadcast related information from an external broadcast management system via a broadcast channel. In an exemplary embodiment, the communication component 1016 further includes a near field communication (NFC) module to facilitate short-range communication.

In an exemplary embodiment, the device 1000 may be implemented by one or more application specific integrated circuits (ASIC), digital signal processors (DSP), digital signal processing devices (DSPD), programmable logic devices (PLD), field programmable I gate array (FPGA), controller, microcontroller, microprocessor, or other electronic components, used to implement the above method for determining a beam scanning range.

In some embodiments, there is also provided a non-transitory computer-readable storage medium having instructions stored thereon, such as the memory 1004 including instructions. The instructions may cause the processor 1020 of the device 1000 to execute the foregoing method. For example, the non-transitory computer-readable storage medium may be ROM, random access memory (RAM), CD-ROM, magnetic tape, floppy disk, optical data storage device, etc.

There is also provided a non-transitory computer-readable storage medium. When instructions in the computer-readable storage medium are executed by a processor of a mobile terminal, the mobile terminal is caused to execute a method for transmitting data.

Those skilled in the art will easily come up with other embodiments of the disclosure after considering the description and practicing the disclosure herein. The disclosure is intended to cover any variations, uses or adaptations of the disclosure, and these variations, uses or adaptations follow the general principles of the disclosure and include common general knowledge or frequently used technical means in the technical field not disclosed in the disclosure. The description and the embodiments are only regarded as exemplary, and the true scope and spirit of the disclosure are indicated by the following claims.

It should be understood that the disclosure is not limited to the precise structure described above and shown in the drawings, and various modifications and changes can be made without departing from the scope of the disclosure. The scope of the disclosure is limited only by the appended claims.

What is claimed is:

1. A method for allocating time domain resources, applied to a base station, the method comprising:
transmitting downlink control information, DCI, signaling by the base station, the DCI signaling being configured to indicate a time domain resource used by a terminal to perform physical uplink shared channel (PUSCH) transmission, the time domain resource comprising two or more slots, or two or more mini-slots, or both two or more slots and two or more mini-slots;
wherein the DCI signaling is further configured to indicate a starting symbol, or an ending symbol, or both the starting symbol and the ending symbol of the time domain resource; the starting symbol being configured to indicate a starting symbol of the PUSCH transmission performed by the terminal, and the ending symbol being configured to indicate an ending symbol of the PUSCH transmission performed by the terminal;
the DCI signaling comprises at least one of one starting symbol of the time domain resource or one ending symbol of the time domain resource, wherein the one starting symbol is configured to indicate the starting symbol of each of the two or more slots; and the one ending symbol is configured to indicate the ending symbol of each of the two or more slots; or
the DCI signaling comprises one starting symbol of the time domain resource and one symbol number, wherein the one starting symbol is configured to indicate the starting symbol of a first one of the two or more mini-slots, and the one symbol number is configured to indicate the number of symbols included in each of the two or more mini-slots and the starting symbol of an $S^{th}$ mini-slot is adjacent to the ending symbol of a $(S-1)^{th}$ mini-slot, where S is an integer greater than 1,
wherein in response to the time domain resource being two or more slots, a scheduling mode of the time domain resource is scheduling based on each slot, a stopping position of a listen before talk (LBT) monitoring is before a starting symbol of a last slot of the two or more slots, and in response to the time domain resource being two or more mini-slots, a scheduling mode of the time domain resource is scheduling based on each mini-slot, a stopping position of the LBT monitoring is a starting symbol of a last mini-slot of the two or more mini-slots.

2. The method of claim 1, comprising one or both of:
(a) the starting symbol of the time domain resource being set for a first one of the two or more slots; or
(b) the ending symbol of the time domain resource being set for a last one of the two or more slots.

3. The method of claim 1, wherein, the DCI signaling is further configured to indicate N redundancy versions (RVs) and the terminal uses a respective RV to perform the PUSCH transmission in each slot of the time domain resource,
where N is the number of the slots in the time domain resource indicated by the DCI signaling.

4. The method of claim 1, wherein, the starting symbol of the time domain resource is set for a first mini-slot or each mini-slot, and the DCI signaling is further configured to indicate the number of symbols included in each mini-slot; or
the starting symbol of the time domain resource is set for each mini-slot, and an adjacent symbol before the starting symbol of an Sth mini-slot is the ending symbol of a $(S-1)^{th}$ mini-slot.

5. The method of claim 1, wherein, the DCI signaling is further configured to indicate M redundancy versions (RVs) and the terminal uses a respective RV to perform the PUSCH transmission in each mini-slot of the time domain resource,
where, M is the number of the mini-slots in the time domain resource indicated by the DCI signaling.

6. The method of claim 1, wherein each slot comprises 14 symbols, and the starting symbol is any one of the 14 symbols.

7. The method of claim 1, wherein in a case where a scheduling mode of the time domain resource is scheduling based on each slot, each slot has at least one starting symbol.

8. A method for transmitting data, applied to a terminal, the method comprising:
receiving, by the terminal, downlink control information (DCI) signaling transmitted by a base station, the DCI signaling being configured to indicate a time domain resource used by the terminal to perform physical uplink shared channel (PUSCH) transmission, the time domain resource comprising two or more slots, or two or more mini-slots, or both the two or more slots and the two or more mini-slots; and
performing the PUSCH transmission by the terminal based on the DCI signaling;
wherein the DCI signaling is further configured to indicate a starting symbol, or an ending symbol, or both the starting symbol and the ending symbol of the time domain resource; the starting symbol being configured to indicate a starting symbol of the PUSCH transmission performed by the terminal, and the ending symbol being configured to indicate an ending symbol of the PUSCH transmission performed by the terminal;
the DCI signaling comprises at least one of one starting symbol of the time domain resource or one ending symbol of the time domain resource, wherein the one starting symbol is configured to indicate the starting symbol of each of the two or more slots; and the one ending symbol is configured to indicate the ending symbol of each of the two or more slots; or
the DCI signaling comprises one starting symbol of the time domain resource and one symbol number, wherein the one starting symbol is configured to indicate the starting symbol of a first one of the two or more mini-slots, and the one symbol number is configured to indicate the number of symbols included in each of the two or more mini-slots and the starting symbol of an $S^{th}$ mini-slot is adjacent to the ending symbol of a $(S-1)^{th}$ mini-slot, where S is an integer greater than 1,
wherein in response to the time domain resource being two or more slots, a scheduling mode of the time domain resource is scheduling based on each slot, a stopping position of a listen before talk (LBT) monitoring is before a starting symbol of a last slot of the two or more slots, and in response to the time domain resource being two or more mini-slots, a scheduling mode of the time domain resource is scheduling based on each mini-slot, a stopping position of the LBT monitoring is a starting symbol of a last mini-slot of the two or more mini-slots.

9. The method of claim 8,
wherein performing the PUSCH transmission by the terminal based on the DCI signaling comprises one or both of:
(c) determining a starting symbol of the PUSCH transmission based on the starting symbol; or
(d) determining an ending symbol of the PUSCH transmission based on the ending symbol by the terminal.

10. The method of claim 9, wherein a position near the starting symbol of the PUSCH transmission in each slot or mini-slot is a PUSCH transmission starting position.

11. The method of claim 10, wherein performing the PUSCH transmission by the terminal based on the DCI signaling comprises one of:

performing, by the terminal, the PUSCH transmission by taking the starting symbol of the PUSCH transmission in each slot or mini-slot as the PUSCH transmission starting position;
performing, by the terminal, the PUSCH transmission by taking a position away from and after the starting symbol of the PUSCH transmission by a preset duration in each slot or mini-slot as the PUSCH transmission starting position;
performing, by the terminal, the PUSCH transmission by taking a position away from and after the starting symbol of the PUSCH transmission by a preset duration plus a timing advance, (TA) in each slot or mini-slot as the PUSCH transmission starting position; or
performing, by the terminal, the PUSCH transmission by taking a starting position of an adjacent symbol after the starting symbol of the PUSCH transmission as the PUSCH transmission starting position.

12. The method of claim 8, further comprising:
receiving, by the terminal, control signaling transmitted by the base station, the control signaling being configured to indicate a stopping position of the LBT monitoring performed by the terminal, the control signaling comprising one or a combination of radio resource control (RRC) signaling, media access control MAC) signaling, and the DCI signaling; or
obtaining a stopping position of the LBT monitoring from a chip.

13. A terminal for transmitting data, comprising:
a processor; and
a memory, configured to store instructions executable by the processor;
wherein the processor is configured to:
receive downlink control information (DCI) signaling transmitted by a base station, the DCI signaling being configured to indicate a time domain resource used by the terminal to perform physical uplink shared channel (PUSCH) transmission, the time domain resource comprising two or more slots, or two or more mini-slots, or both two or more slots and two or more mini-slots; and
perform the PUSCH transmission based on the DCI signaling;
wherein the DCI signaling is further configured to indicate a starting symbol, or an ending symbol, or both the starting symbol and the ending symbol of the time domain resource; the starting symbol being configured to indicate a starting symbol of the PUSCH transmission performed by the terminal, and the ending symbol being configured to indicate an ending symbol of the PUSCH transmission performed by the terminal;
the DCI signaling comprises at least one of one starting symbol of the time domain resource or one ending symbol of the time domain resource, wherein the one starting symbol is configured to indicate the starting symbol of each of the two or more slots; and the one ending symbol is configured to indicate the ending symbol of each of the two or more slots; or
the DCI signaling comprises one starting symbol of the time domain resource and one symbol number, wherein the one starting symbol is configured to indicate the starting symbol of a first one of the two or more mini-slots, and the one symbol number is configured to indicate the number of symbols included in each of the two or more mini-slots and the starting symbol of an $S^{th}$ mini-slot is adjacent to the ending symbol of a $(S-1)^{th}$ mini-slot, where S is an integer greater than 1, wherein in response to the time domain resource being two or more slots, a scheduling mode of the time domain resource is scheduling based on each slot, a stopping position of a listen before talk (LBT) monitoring is before a starting symbol of a last slot of the two or more slots, and in response to the time domain resource being two or more mini-slots, a scheduling mode of the time domain resource is scheduling based on each mini-slot, a stopping position of the LBT monitoring is a starting symbol of a last mini-slot of the two or more mini-slots.

14. The terminal of claim 13,
wherein the processor is further configured to execute one or both of:
(c) determining a starting symbol of the PUSCH transmission based on the starting symbol; or
(d) determining an ending symbol of the PUSCH transmission based on the ending symbol by the terminal.

15. The terminal of claim 14, wherein a position near the starting symbol of the PUSCH transmission in each slot or mini-slot is a PUSCH transmission starting position.

16. The terminal of claim 15, wherein the processor is further configured to execute one of:
performing the PUSCH transmission by taking the starting symbol of the PUSCH transmission in each slot or mini-slot as the PUSCH transmission starting position;
performing the PUSCH transmission by taking a position away from and after the starting symbol of the PUSCH transmission by a preset duration in each slot or mini-slot as the PUSCH transmission starting position;
performing the PUSCH transmission by taking a position away from and after the starting symbol of the PUSCH transmission by a preset duration plus a timing advance (TA) in each slot or mini-slot as the PUSCH transmission starting position; or
performing the PUSCH transmission by taking a starting position of an adjacent symbol after the starting symbol of the PUSCH transmission as the PUSCH transmission starting position.

17. The terminal of claim 13, wherein the processor is further configured to:
receive control signaling transmitted by the base station, the control signaling being configured to indicate a stopping position of the LBT monitoring, the control signaling comprising one or a combination of radio resource control (RRC) signaling, media access control (MAC) signaling, and the DCI signaling; or
obtain a stopping position of the LBT monitoring from a chip.

* * * * *